United States Patent [19]

Upadhya et al.

[11] Patent Number: 5,308,172

[45] Date of Patent: May 3, 1994

[54] BEARING ASSEMBLY

[75] Inventors: Kamleshwar Upadhya, Quartz Hill, Calif.; David S. Lee, Brookfield, Wis.

[73] Assignee: General Electric Company, Milwaukee, Wis.

[21] Appl. No.: 93,609

[22] Filed: Jul. 19, 1993

[51] Int. Cl.⁵ .................... F16C 19/54; F16C 19/10; H01J 35/10
[52] U.S. Cl. .................... 384/453; 378/132; 384/493; 384/518; 384/610
[58] Field of Search .............. 384/476, 493, 517, 518, 384/610, 905, 557; 378/132

[56] References Cited

U.S. PATENT DOCUMENTS

| | | | |
|---|---|---|---|
| 2,550,908 | 5/1951 | Bryant et al. | 384/453 |
| 3,699,373 | 10/1972 | Holland et al. | 378/132 |
| 4,949,368 | 8/1990 | Kubo | 384/508 X |
| 5,117,448 | 5/1992 | Penato et al. | 378/132 |
| 5,140,624 | 8/1992 | Chrisien | 378/132 |

Primary Examiner—Thomas R. Hannon
Attorney, Agent, or Firm—James J. Lichiello; James O. Skarsten

[57] ABSTRACT

A Belleville spring/ball combination is utilized in a rotating anode target bearing assembly in an X-ray tube for thermal and electrical conduction as well as self-centering of the target shaft and noise reduction.

10 Claims, 1 Drawing Sheet

BEARING ASSEMBLY

BACKGROUND OF THE INVENTION

This invention relates to a bearing assembly and, more particularly, to an improved electrically and thermally conducting high speed bearing assembly particularly adapted for electrical high power tubes such as electrical X-ray generating tubes.

X-ray tubes generally comprise a cathode thermionic emitter and an axially spaced anode target positioned in an evacuated tube. Cathode and target are connected in an electrical circuit so that the cathode is electrically heated to emit a stream or beam of electrons directed to the anode target. The electron beam is appropriately focused as a thin beam of very high velocity electrons striking the anode target. X-ray targets utilize a striking surface of predetermined materials (usually a refractory metal) and a particular geometric shape so that the kinetic energy of the striking electron beam is converted to electromagnetic waves of high frequency, i.e. X-rays which emanate from the target to be collimated and focused for penetration into an object for well known x-ray medical diagnostic examination or material analysis procedures. The high velocity electron beam striking the anode target generates extremely high and localized temperatures in the anode target leading to early deterioration of the target structure, particularly composite targets. For this reason anode targets are adapted to rotate so that the impinging electron beam does not concentrate at a small region of the target area for a delayed period of time which could result in a rapid and excessive temperature rise and delay rapid distribution of heat throughout the target structure. As a consequence of progress to higher power x-ray tubes and their concurrent need for greater target heat dissipation, it has become a practice to utilize increasingly higher rotating speed anode target assemblies. A rotating anode x-ray target generally comprises a rotating shaft supported disk-like anode having a concentric annular band of a target metal thereon which is impinged by the electron beam from the cathode. In the enclosed and evacuated environment of an X-ray tube, the target structure must have a high heat storage capacity since most heat transfer from the target takes place essentially through radiation from the target to the x-ray tube structure. The practice of rotating targets has progressed to target rotational speeds exceeding 10,000 rpm. for satisfactory heat distribution and radiation. At such speeds in an adverse environment the bearing assembly for the anode target is required to be of high precision low friction and low wear to maintain effective and optimum longer term operating conditions. Bearing wear leads to high frequency vibration and unacceptable noise levels. In addition, the high voltages required for the cathode and anode operation and the presence of the electron beam leads to the development of high voltage potentials in the target anode bearing assembly with concurrent undesirable electrical arcing and welding.

SUMMARY OF THE INVENTION

An improved bearing assembly for a shaft supported rotating anode target for X-ray tubes utilizes the combination of a Belleville spring and a metal ball thereon to maintain concentricity of the shaft while at the same time serving as a direct thermal and electrical path from the shaft to adjacent structure.

OBJECTS OF THE INVENTION

It is an object of this invention to provide an X-ray tube target rotating shaft bearing assembly having a direct electrical and thermal path or connection from the shaft to adjacent structure.

It is another object of this invention to provide an improved convex spring and ball combination in an x-ray tube target bearing assembly to maintain concentricity of the shaft in the bearing assembly.

It is yet another object of this invention to provide a ball bearing supported shaft assembly for X-ray targets wherein a Belleville spring and silver coated metal ball provides concentricity control of the shaft within a shaft housing and a direct electrical and thermal connection between the shaft and its housing.

These and other objects of this invention will be better understood when taken in connection with the following drawing and description.

DESCRIPTION OF A PREFERRED EMBODIMENT OF THE INVENTION

Figure 1:
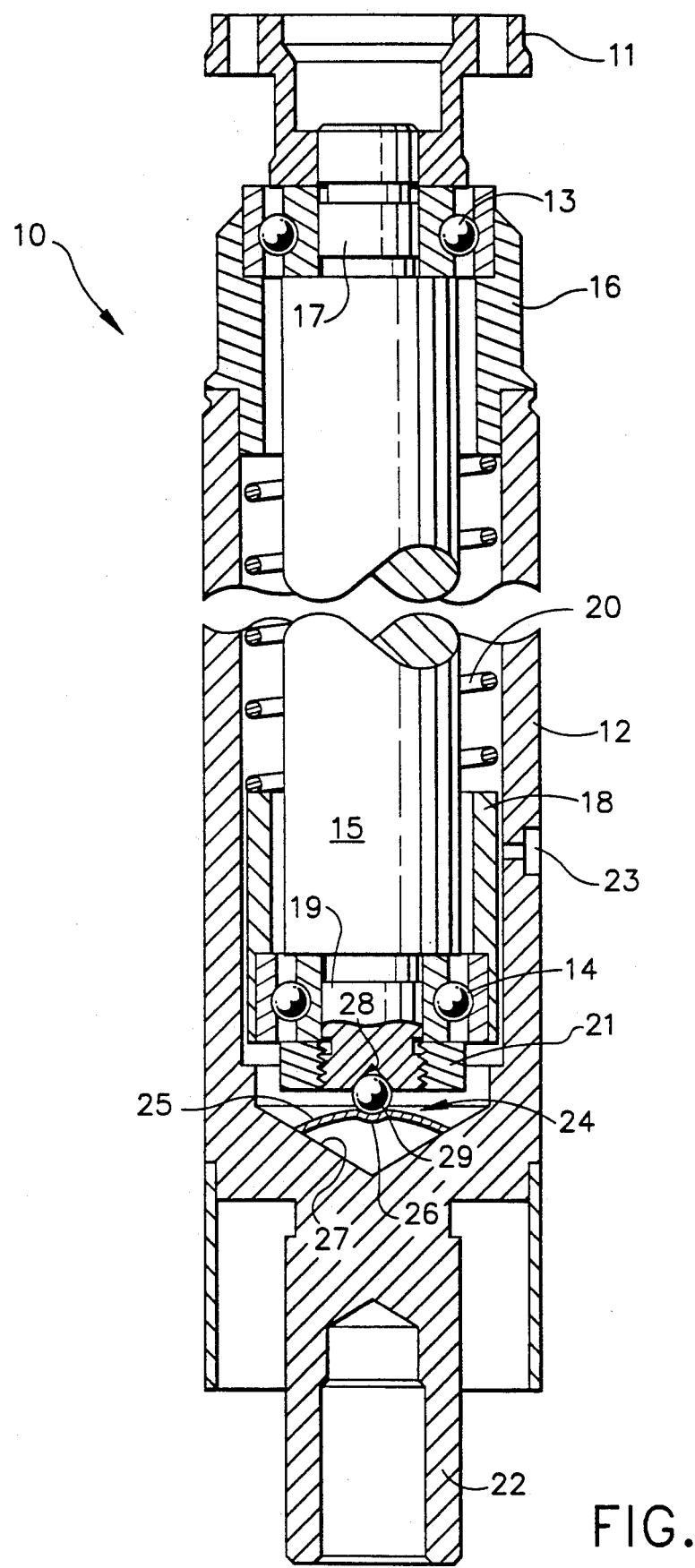
FIG. 1 is a schematic cross-sectional and elevational illustration of an X-ray rotating target bearing assembly of this invention.

Referring now to FIG. 1, bearing assembly 10 is of the kind employed to support a rotating anode structure (not shown) appropriately connected to bearing hub 11 for rotation therewith. Bearing assembly 10 comprises a hollow closed end cylindrical housing or stem 12 in which a pair of axially spaced rolling element bearing units, for example, ball bearing units 13 and 14, support a concentric shaft 15 for rotation with one end of the shaft exposed to and axially spaced from the closed end of housing 12. At the hub 11 end of assembly 10 a cylindrical sleeve-like front retainer 16 is fixed coaxially in housing 12 and supports a front ball bearing unit 13 which encircles a bearing modified section 17 of shaft 15. At the opposite and closed end of housing 12, a sleeve-like rear retainer 18 is concentrically and slidingly fitted in housing 12 with a true clearance of one or more thousands of an inch to support a rear ball bearing unit 14 which encircles a bearing modified section 19 of shaft 15. In order to maintain critical dimensions and adjustment, a cylindrical helical spring member 20 encircles shaft 15 to bear equally and simultaneously oppositely against front retainer unit 16 and rear retainer unit 18. The outside diameter of spring 20 is slightly less than the inside diameter of housing 12 so that a slight clearance is maintained between the spring and housing at operating conditions. Spring loading or bias of spring 20 is set by means of a retaining nut 21 threaded on the end of shaft 15 to bear against the inner race of ball bearing unit 14 while the outer race bears against rear retainer 18. When the inner race of bearing unit 14 engages a shoulder on shaft 15 a maximum or predetermined precompression is set in spring 20 to exert a biasing force against rear retainer 18 and the outer race of ball unit 14 to continually establish proper bearing rotational characteristics during changing operating conditions. For example, during X-ray tube operation, bearing assembly 10 is subjected to extremely high temperatures resulting in differential expansion of components of assembly 10 such as elongation of shaft 15. However, slidable rear retainer 18 in combination with spring 20 permits the elongation of shaft 15 or repositioning of bearing unit 14 to avoid excessive forces being imposed on bearing unit 14.

A disc-like target (not shown) is coaxially connected to bearing hub 11 as is a sleeve (not shown) which concentrically surrounds housing 12 and is electrically and magnetically adapted to serve as an armature for a surrounding electric motor structure (not shown) which is external to the usual evacuated glass x-ray tube. Energization of the motor structure causes the sleeve armature to rotate as well as the attached hub 11 and its target structure. In this connection, the closed end of housing 12 includes an integral and axially externally extending shaft section 22. Section 22 is appropriately splined or threaded to be received in a complementary fitting in the x-ray tube so that rotation of housing 12 is prevented. In order to preclude potential rotation of rear retainer 18 in housing 12, a small screw may be fixedly inserted into aperture 23 in housing 12 to project into an axial groove in retainer 18 to prevent rotation of retainer 18. The described electric motor-armature drive is one of various drive means which may be employed to rotate hub 11 and its connected anode assembly which are supported by the bearing assembly 10 of this invention. Because of the impinging electron beam on the rotating target and the voltage difference, as much as 150 kv, between the cathode (not shown) and the target anode, a high voltage potential is established between shaft 15 and housing 12. During X-ray tube operation it has been found that some sporadic electric arcing takes place between shaft 15 and its components and housing 12, particularly at very small clearances between rear retainer 18 and housing 12 with some highly undesirable welding taking place to restrict axial motion of sliding rear retainer 18. By means of a spring-ball unit 24 of this invention, a more positive and direct electrical connection is established between shaft 15 and housing 12. Spring ball unit 24 comprises a domed planar or continuous surface spring member 25 (as opposed to a wound wire spring) with a concentric circular depression 26 in its crown or highest surface region. Such a domed spring member 25 corresponds to the wall known Belleville spring but with a depression 26 instead of the usual aperture at this position. Belleville spring 25 is positioned concentrically in the closed end of housing 12 so that its periphery rests on a circular tapered shoulder 27 defining the closed end of housing 12 with its domed surface extending in the direction of shaft 15. In this illustrated arrangement, depression 26 of spring 25 is concentric with the exposed end of shaft 15 at bearing unit 14. The exposed end of shaft 15 which is adjacent but spaced from Belleville spring 25 has a concavity recess 28 formed therein concentric with depression 26 of spring 25. A good electrically and thermally conductive metal ball 29 is positioned in depression 26 in Belleville spring 25 to fit into recess 28 of shaft 15. Depression 26 has a diameter slightly larger than that of ball 29. Belleville springs are noted for their constant load or low spring rate characteristic. Accordingly, proper selection of a Belleville spring will provide a constant and predetermined simultaneous bias of ball 29 in shaft concavity 28 and depression 26 of spring 25. In one example of this invention, a spring rate of 0.8 lb./in. for spring 25 provided good results. The diameter of the outer periphery of spring 25 is less than the inner diameter of housing 12 so that expansion and contraction of the spring periphery from temperature or load changes is appropriately accommodated. In this connection, various modifications may be made in spring 25 to improve its functions. For example, the contact periphery of spring 25 may have scallop-like cutaway sections to provide a series of spaced leg supports. One or more circular convolutions or corrugations between the depression 26 and the housing contact periphery of spring 25 may provide a more controlled vertical flexure of spring 25. Spring ball unit 24 establishes a continuing positive and direct thermal and electrical contact path between shaft 15 and housing 12 to obviate electrical arcing problems as described and assist heat transfer from shaft 15 and bearing unit 14. Electrical and thermal conductivity of ball 26 is increased by providing a coating of a highly electrically and thermally conductive metal such as silver, Ag, thereon. In one practice of this invention a silver coating was applied by a silver ion transfer process to provide what is referred to as a silver ion ball 26. Belleville spring 23 is also formed of a good electrical and thermal conducting material such as a metal and may be appropriately coated to improve these characteristics. In one practice of this invention, spring 23 was formed from a copper, Cu, beryllium, Be, alloy.

When shaft 15 rotates at high speed, ball 29 retains predetermined centering contact with shaft 15 and spring 25 while being free to rotate in its respective shaft 15 concavity 28 and spring depression 26. The described ball material and its contact relationship with shaft 15 and spring 25 provides a good thermal path directly from shaft 15 to housing 12 where the more extensive surface area of housing 12 increases heat dissipation.

A further and salient advantage of the use of spring ball unit 24 relates to noise reduction. Dimensional changes caused by bearing wear or temperature differentials, for example, may result in a departure of shaft 15 from its established concentricity. Also, the clearance necessary for a sliding fit between rear retainer 18 and housing 12 defines a generally cantilever structure of shaft 15 in housing 12 with rear retainer 18 acting as the free end of the cantilever structure. During high speed rotation of shaft 15, rear retainer 18 may be caused to strike opposite parts of inner wall of housing 12 with great rapidity. These conditions cause a high degree of rotational noise which is quite undesirable in X-ray equipment and often unacceptable. Bearing noise in X-ray tubes has been found to be in the range of about 64 to 66 decibels. However, the use of a spring ball unit 24 of the present invention provides a significant reduction of noise level, compared to similar tubes without a spring ball unit 24 of the present invention.

Spring ball unit 24 of this invention also serves as an automatic self-centering device and provides continuous biasing action from spring 25 to maintain centering of shaft 15 with ball 29 in spring depression 26 and concavity 28 of shaft 15. The biasing actions of spring 25 continuously urges ball 29 into a central and concentric position in concavity 28 and depression 26 to maintain the predetermined concentricity of shaft 15. As a result, any tendency of shaft 15 to move out of concentricity is counteracted by spring ball unit 24 without need for any external assistance, i.e., automatically, and with effective and continuous noise reduction. The excellent heat conductivity of spring ball unit 24 also aids in providing an additional heat path from front bearing unit 13 for some concurrent and associated noise reduction.

This invention provides a spring ball unit for high speed shafts, particularly in X-ray tubes where the unit functions as a thermal and electrical contact path between the shaft and an adjacent structure while reducing high rpm rotational noise level by automatically biasing the shaft towards concentricity in its rotating mode.

While this invention has been described with respect to a preferred embodiment, it will be understood by those skilled in the art that various changes and modifications may be made without departing from the spirit and scope of the invention.

What is claimed is:

1. An improved electrically and thermally conducting self-centering bearing assembly comprising in combination
   (a) a hollow cylinder housing member having one closed end,
   (b) a pair of axially spaced apart concentric shaft bearings in said housing and axially spaced from the said closed end,
   (c) a shaft member supported in said bearings for rotation therein with one end of said shaft exposed to said housing closed end,
   (d) said shaft having a concentric conical cavity therein at said exposed shaft end,
   (e) a spring ball unit in said housing having a circular dome spring means concentrically positioned in said housing at said closed end,
     (1) said dome spring means including a circular depression concentrically therein and spaced from said closed housing end, and
     (2) an electrically and thermally conducting ball in said circular depression and biased by said dome spring means into simultaneous engagement with said conical cavity in said shaft and said dome spring circular depression.

2. The invention as recited in claim 1 wherein said bearings are ball bearings.

3. The invention as recited in claim 1 wherein said dome spring means is a Belleville spring.

4. The invention as recited in claim 1 wherein said dome spring means is formed from a good electrically and thermally conductive metal.

5. The invention as recited in claim 1 wherein said spring ball unit is fitted adjacent said housing closed end with the periphery of said dome metal spring engaging said closed end, and said dome extending towards said shaft.

6. The invention as recited in claim 5 wherein a bearing hub is fitted on said shaft at the open end of said housing to rotate with said shaft.

7. The invention as recited in claim 6 wherein an axially and externally extending coaxial shaft extension at the closed end of said housing is adapted to prevent rotation of said housing.

8. The invention as recited in claim 7 comprising further,
   (a) a retainer member fixed in the open end of said housing and supporting one of said bearings,
   (b) a reverse retainer member slidingly fitted in said housing adjacent to and spaced from said closed end to support the other of said pair of axially spaced bearings,
   (c) and spring means in said housing and between said fixed and sliding retainers to simultaneously and oppositely bear against said fixed retainer and said sliding retainer to provide a biasing action on said reverse retaining member and its supported bearing.

9. The invention as recited in claim 8 wherein an adjusting nut is threaded on the exposed end of said shaft to adjustably position said slidingly fitted retainer in said housing to preset a compression in said spring means.

10. A bearing assembly particularly adapted to support a rotating target anode in an X-ray tube comprising in combination
    (a) a hollow cylindrical housing having one closed end,
    (b) a pair of axially spaced ball bearings in said housing with one bearing adjacent to and spaced from said closed end,
    (c) a high speed rotating shaft member having opposite ends fitted into said bearings to be rotationally supported thereby with one end of said shaft bearing being exposed through one of said bearings at said closed end,
    (d) a spring ball unit fitted concentrically in said housing adjacent said closed end and between said exposed end of said shaft and said housing closed end comprising in combination
      (1) a domed surface metal spring fitted in the closed end of said housing concentrically with said exposed shaft end,
      (2) said domed surface spring formed with a shallow circular depression concentrically therein at the crown of said dome surface to be concentric with said exposed end of said shaft,
      (3) a good electrically and thermally conductive ball on said dome and in said depression, said ball having an increased thermally and electrically conductive silver coating thereon,
      (4) said exposed end of said shaft being formed with a concentric conical cavity therein into which said ball projects,
      (5) said dome spring simultaneously biasing said ball into said shaft conical cavity and said dome depression to provide self-centering lateral bias for any movement of said shaft out of concentricity with said housing, said spring comprising a copper (Cu) beryllium (Be) alloy.

* * * * *